UNITED STATES PATENT OFFICE.

EDWIN EUSTON, OF SCRANTON, PENNSYLVANIA.

PROCESS OF PRODUCING WHITE LEAD.

1,349,334.  Specification of Letters Patent.  Patented Aug. 10, 1920.

No Drawing.  Application filed March 22, 1919. Serial No. 284,371.

*To all whom it may concern:*

Be it known that I, EDWIN EUSTON, a citizen of the United States, residing at Scranton, Pennsylvania, have invented a certain new and useful Improvement in Processes of Producing White Lead, of which the following is a full, clear, and exact description, such as will enable others skilled in the art to which it appertains to make and use the same.

My invention relates to a process of producing white lead, the principal objects of my invention being to generally improve upon the existing methods and processes of producing white lead, and to provide a novel and easily practised method whereby white lead of the best quality can be easily, quickly and economically produced.

The process disclosed in United States Letters Patent No. 1,079,481, granted to me November 25, 1913, covers the method of producing white lead consisting in treating approximately neutral lead acetate solution with carbon dioxid gas and basic lead acetate solution, whereas my present process covers the method of producing white lead consisting in treating approximately neutral lead acetate solution with carbon dioxid gas and basic lead carbonate.

The processes disclosed in United States Letters Patent No. 1,075,143, granted to me October 7, 1913, and Nos. 1,106,793 and 1,106,794 granted to me August 11, 1914, cover the methods of producing white lead which involve the separate production and subsequent mixing of two precipitates of basic lead carbonate of respectively less than 11.3 per cent. carbon dioxid and more than 11.3 per cent. carbon dioxid, whereas my present process covers the method of producing white lead consisting in treating approximately neutral lead acetate solution with carbon dioxid gas and basic lead carbonate to form directly, and without the necessity of separate production and subsequent mixture, a mixture of normal lead carbonate and basic lead carbonate in the desired proportions.

My present process of producing white lead consists, first,—the treatment of approximately neutral (preferably slightly alkaline) lead acetate solution with carbon dioxid gas, and introducing thereinto basic lead acetate solution in amount and at a rate sufficient to maintain the said approximately neutral condition of the said solution; and, second, the further treatment of the solution and precipitate thus obtained with carbon dioxid gas until part, but not all, of the said precipitate of basic lead carbonate is converted into normal lead carbonate.

One relatively simple and practical way of practising my invention is, the preparation in any well-known way of a solution of basic lead acetate to be used as the solution from which to form the precipitate. The strength of this solution may vary according to conditions and requirements, and said solution is preferably introduced gradually into a relatively tall tank or receptacle containing carbon dioxid gas or a mixture of the latter and other diluting gases through which approximately neutral lead acetate solution of any desired strength is circulated, preferably by spraying. The introduction of this solution into the tank or container is in such degree or volume as to maintain substantial uniformity of the fairly neutral average condition of the liquid contents of the tank and any variation being preferably toward alkalinity rather than toward acidity. The contents of this tank or container may be removed intermittently in one or more batches, but I prefer to use the continuous method by providing the tank with an overflow pipe, the use of which maintains a given volume of liquid within the tank.

The precipitate of basic lead carbonate and the substantially neutral lead acetate solution thus obtained are now circulated, preferably by spraying through a tank containing carbon dioxid gas or a mixture of said gas and other diluting gases until any desired part, but not all, of the basic lead carbonate has been converted into normal lead carbonate as may be determined by tests of the degree of acidity of the lead acetate solution or by other suitable means.

The resulting mixture of precipitates of basic lead carbonate and normal lead carbonate is then washed and dried and forms a product containing 11.3 per cent. to 14.3 per cent. of carbon dioxid as may be desired.

If desired, the entire process may be carried out in one tank instead of a plurality of tanks. Further, I do not desire to be understood as limiting myself to any special form of apparatus, nor to any fixed temperatures, strength of solution, pressure or concentration of gases, as these may be varied within wide limits and are not essential to the process.

I claim:

1. The process of producing white lead consisting in treating approximately neutral lead acetate solution with carbon dioxid gas, and introducing thereinto basic lead acetate solution in amount and at a rate sufficient to maintain the said approximately neutral condition of the said solution, and then treating the resultant solution and precipitate with carbon dioxid gas until a part of the precipitate of basic lead carbonate is converted into normal lead carbonate, thus yielding a mixture in proportions to form a product containing 11.3 per cent. to 14.3 per cent. of carbon dioxid.

2. The process of producing white lead which consists in treating approximately neutral lead acetate solution and basic lead carbonate with carbon dioxid to convert a part, but not all, of said basic lead carbonate into normal lead carbonate, yielding a product containing 11.3 per cent. to 14.3 per cent. carbon dioxid.

In testimony whereof I hereunto affix my signature this 17th day of March, 1919.

EDWIN EUSTON.